(12) United States Patent
Kim et al.

(10) Patent No.: US 8,948,076 B2
(45) Date of Patent: Feb. 3, 2015

(54) METHOD AND APPARATUS FOR TRANSMITTING AND RECEIVING REFERENCE SIGNAL IN WIRELESS COMMUNICATION SYSTEM

(75) Inventors: Sung Tae Kim, Gyeonggi-do (KR); Youn Sun Kim, Gyeonggi-do (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 264 days.

(21) Appl. No.: 13/210,078

(22) Filed: Aug. 15, 2011

(65) Prior Publication Data

US 2012/0039282 A1     Feb. 16, 2012

(30) Foreign Application Priority Data

Aug. 13, 2010 (KR) .......... 10-2010-0078232

(51) Int. Cl.
*H04B 7/14* (2006.01)
*H04W 48/12* (2009.01)
*H04W 28/00* (2009.01)

(52) U.S. Cl.
CPC .............. *H04W 48/12* (2013.01); *H04W 28/00* (2013.01)
USPC ....................................................... 370/315

(58) Field of Classification Search
CPC . H04W 52/146; H04W 52/44; H04W 52/325; H04W 72/0473; H04B 7/2628; H04L 5/0007; H04L 5/0035; H04L 5/0048; H04L 5/005; H04L 5/0053
USPC .......................... 370/310, 315, 316, 317, 318
See application file for complete search history.

(56) References Cited

U.S. PATENT DOCUMENTS

| | | | | |
|---|---|---|---|---|
| 8,305,987 B2* | 11/2012 | Fong et al. | ..................... | 370/329 |
| 8,446,849 B2* | 5/2013 | Damnjanovic | ................ | 370/311 |
| 2008/0130615 A1* | 6/2008 | Kashiwagi et al. | ........... | 370/343 |
| 2008/0159215 A1* | 7/2008 | Hosein | ......................... | 370/329 |
| 2009/0046672 A1 | 2/2009 | Malladi et al. | | |
| 2009/0252077 A1* | 10/2009 | Khandekar et al. | ........... | 370/312 |
| 2010/0177697 A1 | 7/2010 | Tanno et al. | | |
| 2010/0273506 A1* | 10/2010 | Stern-Berkowitz et al. | ........................ | 455/456.1 |

(Continued)

FOREIGN PATENT DOCUMENTS

| | | |
|---|---|---|
| EP | 2 169 865 | 3/2010 |
| WO | WO 2009/023835 | 2/2009 |

(Continued)

OTHER PUBLICATIONS

LG Electronics: "Muting Aspects and Intercell CSI-RS Design", R1-102698, TSG-RAN WG1 Meeting #61, May 10, 2010.

(Continued)

*Primary Examiner* — Fan Ng
(74) *Attorney, Agent, or Firm* — The Farrell Law Firm, P.C.

(57) ABSTRACT

Methods and apparatus are provided for transmitting processing reference signals in a mobile communication system. A base station determines a reference signal pattern comprising at least one resource element, generates a bitmap indicator indicating whether zero transmission power is assigned to the at least one resource element of the reference signal pattern, and transmits the reference signal pattern and the bitmap indicator to a terminal. The terminal receives the reference signal pattern and the bitmap indicator, and processes a reference signal extracted according to the reference signal pattern and the bitmap indicator.

20 Claims, 6 Drawing Sheets

(56) References Cited

U.S. PATENT DOCUMENTS

| | | |
|---|---|---|
| 2011/0070891 A1 | 3/2011 | Nishio et al. |
| 2012/0033643 A1* | 2/2012 | Noh et al. .................... 370/335 |
| 2012/0039282 A1* | 2/2012 | Kim et al. .................... 370/329 |
| 2013/0223366 A1* | 8/2013 | Papasakellariou et al. ... 370/329 |
| 2014/0036796 A1* | 2/2014 | Etemad et al. ................ 370/329 |

FOREIGN PATENT DOCUMENTS

| | | |
|---|---|---|
| WO | WO 2009/157167 | 12/2009 |
| WO | WO 2009/157487 | 12/2009 |

OTHER PUBLICATIONS

ZTE: "CSI-RS Muting Evaluation", R1-102900, 3GPP TSG RAN WG1 Meeting #61, May 10, 2010.
Huawei: "CSI-RS Pattern Design", R1-103101, 3GPP TSG RAN WG1 Meeting #61, May 10, 2010.

* cited by examiner

FIG. 1
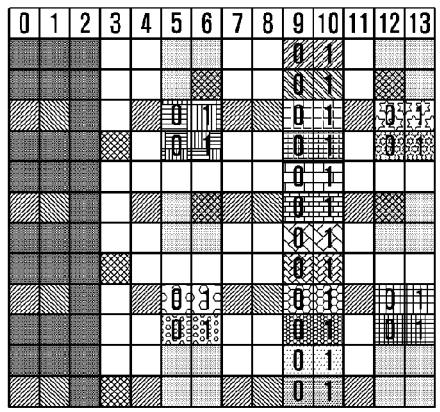
(a) 2 CSI-RS ports
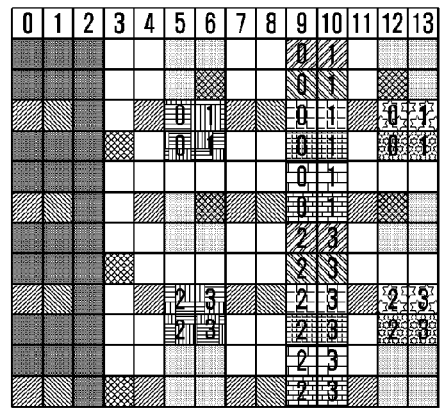
(b) 4 CSI-RS ports
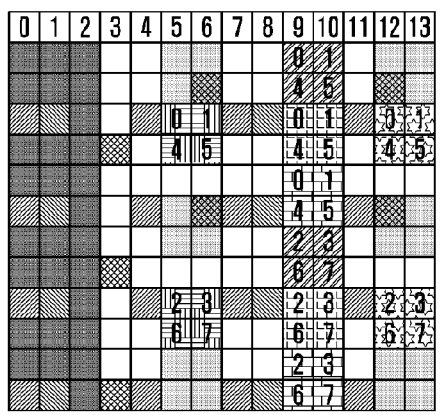
(c) 8 CSI-RS ports
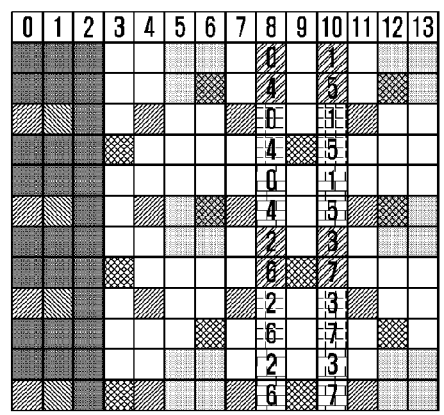
(d) TDD only set
- CRC port #1,2
- DRC port #5
- PDCCH
- CRS port #3,4
- DMRS(Rel 9,10)
- PDSCH FIG. 2
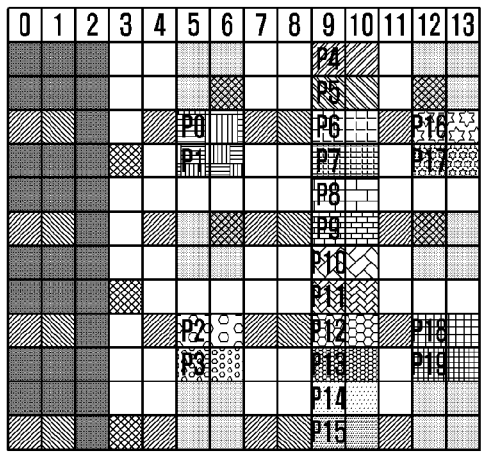
(a) 2 CSI-RS ports
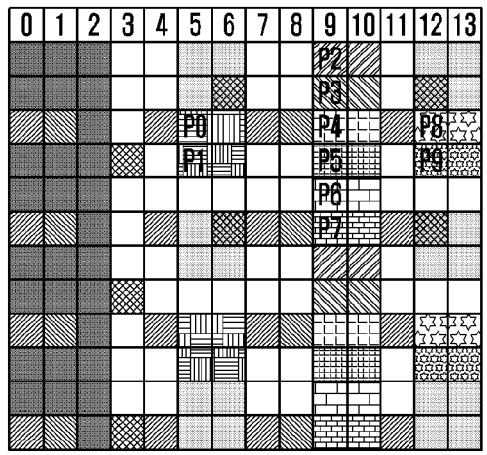
(b) 4 CSI-RS ports
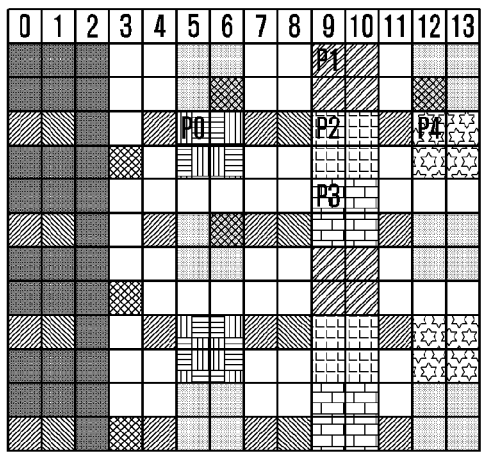
(c) 8 CSI-RS ports
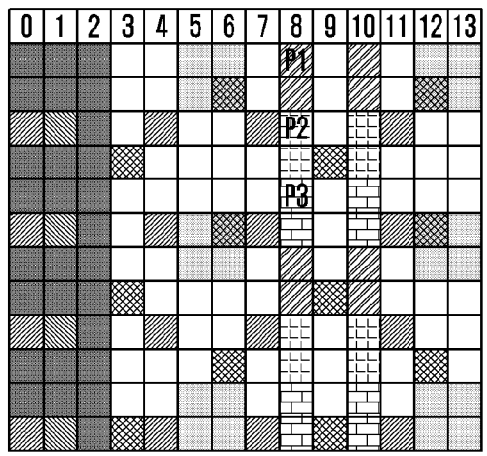
(d) TDD only set
CRC port #1,2
DRC port #5
PDCCH
CRS port #3,4
DMRS(Rel 9,10)
PDSCH

METHOD AND APPARATUS FOR TRANSMITTING AND RECEIVING REFERENCE SIGNAL IN WIRELESS COMMUNICATION SYSTEM

PRIORITY

This application claims priority under 35 U.S.C. §119(a) to an application filed in the Korean Intellectual Property Office on Aug. 13, 2010, and assigned Serial No. 10-2010-0078232, the contents of which are incorporated herein by reference.

BACKGROUND OF THE INVENTION

1. Field of the Invention

The present invention relates generally to a cellular radio communication system, and more particularly, to a method in which a transmitter informs a receiver of a reference signal pattern that is to be muted in a system.

2. Description of the Related Art

Mobile communication systems have evolved into high-speed, high-quality wireless packet data communication systems that provide data services and multimedia services that far exceed the early voice-oriented services. Various mobile communication standards have been developed to support services of the high-speed, high-quality wireless packet data communication systems. These standards include High Speed Downlink Packet Access (HSDPA) and High Speed Uplink Packet Access (HSUPA), both defined in $3^{rd}$ Generation Partnership Project (3GPP), High Rate Packet Data (HRPD) defined in $3^{rd}$ Generation Partnership Project-2 (3GPP2), and 802.16 defined in Institue of Electrical and Electronic Engineers (IEEE).

The existing $3^{rd}$ generation wireless packet data communication systems, such as HSDPA, HSUPA and HRPD, use specific technologies, such as an Adaptive Modulation and Coding (AMC) method and a Channel-Sensitive Scheduling (CSS) method, to improve transmission efficiency. Through the use of the AMC method, a transmitter can adjust an amount of transmission data according to a channel state. Specifically, when the channel state is not 'Good', the transmitter reduces the amount of transmission data to adjust a reception error probability to a desired level. When the channel state is 'Good', the transmitter increases the amount of transmission data to adjust the reception error probability to the desired level, thereby efficiently transmitting a large volume of information. Through the use of a CS S-based resource management method, the transmitter selectively services a user having a channel state that is better than those of other users. This selective servicing provides an increase in system capacity when compared to a method of allocating a channel to one user and servicing the user with the allocated channel. Such a capacity increase is referred to as 'multi-user diversity gain'. Thus, the AMC method and the CSS method each apply an appropriate modulation and coding scheme at the most-efficient time, which is determined based on partial channel state information that is fed back from a receiver.

Research has been conducted in order to replace Code Division Multiple Access (CDMA), the multiple access scheme used in the $2^{nd}$ and $3^{rd}$ generation mobile communication systems, with Orthogonal Frequency Division Multiple Access (OFDMA) in the next generation system. 3GPP and 3GPP2 have begun standardization of evolved systems employing OFDMA. The OFDMA scheme results in a capacity increase when compared to the CDMA scheme. One reason for the capacity increase in the OFDMA scheme is that the OFDMA scheme can perform scheduling in the frequency domain (frequency domain scheduling). While the transceiver acquires capacity gain according to a time-varying channel characteristic using the CSS method, the transceiver can obtain a higher capacity gain through the use of a frequency-varying channel characteristic.

In order to increase the capacity gain using the aforementioned methods, information on the radio channel condition is required. The more accurate the radio channel condition information the greater the capacity gain. When measuring the radio channel condition based on a reference signal, the accuracy of the measurement increases as the Signal-to-Interference plus Noise Ratio (SINR) of the received reference increases. Accordingly, in order to increase the accuracy of the channel condition information, the power of the interference on the received reference signal must be reduced. Muting is one method that reduces the interference. Muting empties a time resource, a frequency resource, an antenna resource, or a code resource used by other transmitters to transmit their reference signals.

In order gain the advantages provided by muting, the transmitter should notify the receiver of the Resource Elements (REs) at which the reference signal is muted. In a 3GPP Long Term Evolution (LTE) system, for example, there are not a large number of reference signal patterns because the reference signal pattern is determined based on the Cell ID. In an LTE-Advanced (LTE-A) system, however, up to 20 reference signal patterns can be used per antenna port and multiple reference signal patterns can be muted regardless of the transmission of the reference signals.

SUMMARY OF THE INVENTION

The present invention has been made to address at least the above problems and/or disadvantages and to provide at least the advantages described below. Accordingly, an aspect of the present invention provides a method for informing the receiver of the reference pattern to be muted in a system, such as LTE-A, in which the number of reference signal patterns varies depending on the antenna port.

According to an aspect of the present invention, a method is provided for transmitting a reference signal of a base station in a mobile communication system. A reference signal pattern having at least one resource element is determined at the base station. A bitmap indicator indicating whether zero transmission power is assigned to the at least one resource element of the reference signal pattern is generated at the base station. The reference signal pattern and bitmap indicator are transmitted from the base station to a terminal.

According to another aspect of the present invention, a base station is provided for transmitting reference signals in a mobile communication system. The base station includes a reference signal pattern determiner that determines a reference signal pattern having at least one resource element. The base station also includes a reference signal pattern muting determiner that generates a bitmap indicator indicating whether zero transmission power is assigned to the at least one resource element of the reference signal pattern. The base station further includes a transceiver that transmits the reference signal pattern and the bitmap indicator to a terminal.

According to an additional aspect of the present invention, a method is provided for processing reference signals transmitted by a base station in a mobile communication system. A terminal receives a reference signal pattern having at least one resource element from the base station. A bitmap indicator, indicating whether zero transmission power is assigned to the at least one resource element of the reference signal pattern, is received. The reference signal extracted according to the reference signal pattern and the bitmap indicator is processed.

According to a further aspect of the present invention, a terminal is provided that processes reference signals transmitted by a base station in a mobile communication system. The terminal includes a transceiver that communicates signals with the base station. The terminal also includes a controller that controls the transceiver to receive a reference signal pattern having at least one resource element and a bitmap indicator indicating whether zero transmission power is assigned to the at least one resource element of the reference signal pattern, and that processes the reference signal extracted according to the reference signal pattern and the bitmap indicator.

According to another aspect of the present invention, a system is provided for transmitting and processing reference signals in a mobile communication system. The system includes a base station that determines a reference signal pattern comprising at least one resource element, generates a bitmap indicator indicating whether zero transmission power is assigned to the at least one resource element of the reference signal pattern, and transmits the reference signal pattern and the bitmap indicator to a terminal. The system also includes the terminal that receives the reference signal pattern and the bitmap indicator, and processes a reference signal extracted according to the reference signal pattern and the bitmap indicator.

According to an additional aspect of the present invention, an article of manufacture is provided for transmitting a reference signal of a base station in a mobile communication system, having a machine readable medium containing one or more programs which when executed implement the steps of: determining, at the base station, a reference signal pattern comprising at least one resource element; generating, at the base station, a bitmap indicator indicating whether zero transmission power is assigned to the at least one resource element of the reference signal pattern; and transmitting the reference signal pattern and bitmap indicator from the base station to a terminal.

Additionally, according to a further aspect of the present invention, an article of manufacture is provided for processing reference signals transmitted by a base station in a mobile communication system, having a machine readable medium containing one or more programs which when executed implement the steps of: receiving, at a terminal, a reference signal pattern from the base station, wherein the reference signal pattern comprises at least one resource element from the base station; receiving a bitmap indicator indicating whether zero transmission power is assigned to the at least one resource element of the reference signal pattern; and processing a reference signal extracted according to the reference signal pattern and the bitmap indicator.

BRIEF DESCRIPTION OF THE DRAWINGS

The above and other objects, features and advantages of the present invention will become more apparent from the following detailed description when taken in conjunction with the accompanying drawings, in which:

FIG. 1 is a diagram illustrating a Channel State Information Reference Signal (CSI-RS) pattern for use in an LTE-A system, according to an embodiment of the present invention;

FIG. 2 is a diagram illustrating pattern ID assignment to the CSI-RS pattern for use in an LTE-A, according to an embodiment of the present invention;

DETAILED DESCRIPTION OF EMBODIMENTS OF THE PRESENT INVENTION

Figure 3:
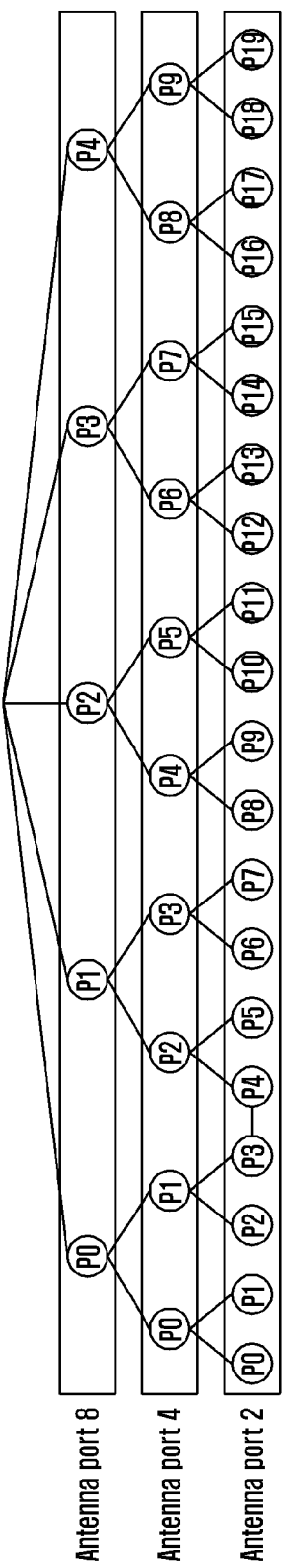
FIG. 3 is a diagram illustrating a tree structure for use in a muting pattern notification method, according to an embodiment of the present invention.

Embodiments of the present invention are described in detail with reference to the accompanying drawings. It should be noted that similar components are designated by similar reference numerals although they are illustrated in different drawings. Detailed descriptions of constructions or processes known in the art may be omitted to avoid obscuring the subject matter of the present invention.

The terms utilized in the description are defined based on the functionality of the embodiments of the present invention, and may vary according to the intention of a user or an operator, usage, etc. Therefore, the definitions should be made based on the overall content of the present specification.

In the following description, muting refers to a technique for emptying the time, frequency, antenna, or code resources through which a neighbor transmitter transmits reference signals. Thus, muting a resource means setting a transmit power to zero for that resource.

If the resource is used, the transmission power is not zero for that resource. Accordingly, if the resource is not muted, a non-zero transmission power is assigned to that resource.

Although a description of embodiments of the present invention is provided with reference to the OFDM-based mobile communication system, by way of example, it will be understood by those skilled in the art that the embodiments of the present invention can be applied to other communication systems having similar technical backgrounds and channel formats, with a slight modification, without departing from the spirit and scope of the present invention.

In a first embodiment of the present invention, a transmitter notifies a receiver of muting with fixed RE granularity signaling. Since muting can be applied to a plurality of reference signal patterns, the number of bits required for the transmitter to notify the receiver of muting is equal to the number of cases of muting.

FIG. 1 is a diagram illustrating Channel Station Information Reference Signal (CSI-RS) pattern in an LTE-A system. Parts (a), (b), (c), and (d) of FIG. 1 show the CSI-RS transmission patterns for the cases that the transmitter and the receiver use 2, 4, and 8 antenna ports, and TDD, respectively.

In case that 2 antenna ports are used as shown in part (a) of FIG. 1, the CSI-RS is transmitted in pairs of 0 and 1 allocated to the resource elements having the same shape. In case of part (b) of FIG. 1 in which 4 antenna ports are used, the CSI-RS is transmitted in pairs of 0, 1, 2 and 3 allocated to the resource elements having the same shape. In case of part (c) of FIG. 1 in which 4 antenna ports are used, the CSI-RS is transmitted in pairs of 0, 1, 2, 3 and 4, 5, 6, and 7. In part (d) of FIG. 1, the CSI-RS is transmitted certain resource elements in the $8^{th}$ and $10^{th}$ symbols.

It is noted that the resource elements paired to transmit the CSI-RS can be allocated a pattern ID, e.g., P1 and P2 as depicted in FIG. 2.

The reference signal pattern, as shown in FIG. 1, is transmitted on fixed RE positions. However, the number of REs constituting a reference signal pattern varies according to the number of antenna ports. In order to maximize the granularity, it is effective to notify of muting in units of RE. In this case, at least two REs are assigned for the reference signal of the serving cell. If REs are assigned, non-zero transmission power is assigned to the corresponding Res. Two REs are required for transmitting a minimum reference signal with which the User Equipment (UE) can measure the radio channel condition of the serving cell. Accordingly, in order to notify of muting in the highest granularity, a total 38 bits is required. The number of bits required for the notification of muting varies. Table 1 shows the numbers of bits required for different RE granularities in the muting scheme, according to an embodiment of the present invention.

TABLE 1

| RE granularity | bits required for notifying of muting |
|---|---|
| 1 | 40 ($b_0, b_1, b_2, \ldots, b_{39}$) |
| 2 | 20 ($b_0, b_1, b_2, \ldots, b_{19}$) |
| 4 | 10 ($b_0, b_1, b_2, \ldots, b_9$) |
| 8 | 5 ($b_0, b_1, b_2, b_3, b_4$) |
| TDD only | 3 ($b_0, b_1, b_2$) |

In Table 1, one bit represents an RE of the corresponding granularity and indicates whether the corresponding RE is muted. Specifically, each bit indicates whether the transmission power of the corresponding RE is set to 0. For example, if the RE granularity is 2, one of the reference signal patterns available for two antenna ports in FIG. 2 is muted using one bit. More specifically, assuming that $b_0, b_1, b_2, \ldots, b_{19}$ are muting indicators, each individual bit indicates whether the reference signal patterns P0 to P19 of FIG. 2 are used. For example, if $b_0=1$ (or 0), the pattern P0 is muted. In this manner, the muting indicators of the embodiments of the present invention are expressed in the form of bitmap. Accordingly, the terms 'muting indicator' and 'bitmap indicator' are interchangeably used in the following description of embodiments of the present invention.

Table 1 shows a case where the number of antenna ports to the reference signals of the serving cell is equal to the RE granularity for notifying of muting.

However, the number of antenna ports to the reference signals of the serving cell may differ from the RE granularity for notifying of muting. If the number of antenna ports to the reference signals is less than the RE granularity, a reference signal pattern carrying reference signals may be muted. In this case, the REs to be muted are partially muted, with the exception of the reference signals of the serving cell. Specifically, the RE carrying the reference signal of the serving cell is not assigned a transmission power set to 0.

Referring to FIG. 2, it is assumed that the serving cell has two antenna ports and uses the reference signal pattern P0. If the RE granularity for muting is 4, the muting application is notified in consideration of 4 antenna ports. If the transmitter provides a muting indicator for pattern P0, the receiver recognizes the situation as if the reference signals are transmitted in all REs of pattern P0 when there are two antenna ports, and two REs not carrying the reference signals are muted in pattern P0 when there are four antenna ports.

In addition to the muting method provided in Table 1, another muting method is provided with diverse RE granularities as shown in Table 2.

TABLE 2

| RE granularity | bits required for notifying of muting |
|---|---|
| 1 | 38 ($b_0, b_1, b_2, \ldots, b_{37}$) |
| 2 | 19 ($b_0, b_1, b_2, \ldots, b_{18}$) |
| 4 | 9 ($b_0, b_1, b_2, \ldots, b_8$) |
| 8 | 4 ($b_0, b_1, b_2, b_3$) |
| TDD only | 2 ($b_0, b_1$) |

Unlike Table 1, Table 2 shows muting indicators in which the part used for transmitting the reference signal is omitted from individual patterns. For example, when the RE granularity is 8 and the reference signal pattern P1 is used, the muting pattern indicators are interpreted as shown in Table 3, where all the patterns, excluding those carrying reference signals, are linked in order.

TABLE 3

| Muting indicator | Corresponding reference signal pattern |
|---|---|
| b0 | P0 |
| b1 | P2 |
| b2 | P3 |
| b3 | P4 |

When compared with Table 1, the number of bits in Table 2 can be reduced by as many as 1 bit or 2 bits. When the RE granularity is 1 in Table 2, 2 bits are saved. This is because the least number of REs are used for the reference signal when the number of antenna ports is 2.

In the Table 3, the number of antenna ports to the reference signals is equal to the RE granularity of the muting indicator, however, the RE granularity of the muting indicator can greater than the number of antenna ports. In this case, the patterns, excluding the pattern including the reference signals of the serving cell, are mapped to the muting indicators in order. Table 4 shows an embodiment in which the pattern P1 is used in the case of an RE granularity of 8 and 4 antenna ports.

TABLE 4

| Muting indicator | Corresponding reference signal pattern |
|---|---|
| b0 | P0 |
| b1 | P2 |
| b2 | P3 |
| b3 | P4 |

When the number of antenna ports is 4, the pattern P1 includes the pattern P0 for when the number of antenna ports is 8, such that the reference signal patterns, except for the pattern P0, are mapped to the muting indicator.

An embodiment of the present invention relating to the muting pattern notification method with fixed RE granularities has been described above. A second embodiment of the present invention relating to a tree structure based notification is described in detail below.

Considering the reference signal patterns of FIG. 1, another embodiment of the present invention proposes a method for notifying of the muting pattern using a tree structure, in that the patterns for cases having a large number of antenna ports include patterns for cases having a small number of antenna ports.

The reference signal patterns of FIGS. 1 and 2 show that the reference signal patterns for cases having a small number of antenna ports are gathered into the reference signal patterns for cases having a large number of antenna ports. For example, in FIG. 2, the reference signal pattern P0 for the 8 antenna ports is formed by arranging the reference signals patterns P0, P1, P2, and P3 for the 2 antenna ports. This structure can be expressed in the form of a tree as shown in FIG. 3, according to an embodiment of the present invention. Using the tree structure, the muting pattern notification scheme can be determined as described below.

A bitmap can be configured by allocating one bit to each node, as shown in FIG. 3. For example, all cases can be classified according to the number of antenna ports, such that the bitmaps for the cases of two antenna ports and four antenna ports case. This results in the same method as described above with respect to the muting pattern notification method with fixed RE granularities.

When allocating one codeword per node, since the total number of nodes is 35, 6 bits are need to identify a node with a codeword, as shown in Table 5 below.

TABLE 5

| Muting indicator (b0, b1, b2, b3, b4, b5) | Corresponding node |
| --- | --- |
| 000000 | P0 for 8 antenna ports |
| 000001 | P1 for 8 antenna ports |
| 000010 | P2 for 8 antenna ports |
| 000011 | P3 for 8 antenna ports |
| 000100 | P4 for 8 antenna ports |
| 000101 | P0 for 4 antenna ports |
| 000110 | P1 for 4 antenna ports |
| — | — |
| — | — |
| — | — |
| 100001 | P18 for 2 antenna ports |
| 100010 | P19 for 2 antenna ports |

Since only one node can be designated, the degree of freedom for muting pattern notification decreases as compared to the methods described above.

However, unlike the above-described methods, one codeword can be allocated to one node when the number of antenna ports is 8 or 4. Specifically, the muting pattern can be notified using 4 bits as shown in Table 6.

TABLE 6

| Muting indicator ($b_0, b_1, b_2, b_3$) | Corresponding node |
| --- | --- |
| 0000 | P0 for 8 antenna ports |
| 0001 | P1 for 8 antenna ports |
| 0010 | P2 for 8 antenna ports |
| 0011 | P3 for 8 antenna ports |
| 0100 | P4 for 8 antenna ports |
| 0101 | P0 for 4 antenna ports |
| 0110 | P1 for 4 antenna ports |
| — | — |
| — | — |
| 1101 | P8 for 4 antenna ports |
| 1110 | P9 for 4 antenna ports |

Similarly, one codeword can be allocated to one node when the number of antenna ports is 8. Specifically, the muting pattern can be notified using 3 bits as shown in Table 7.

TABLE 7

| Muting indicator (b0, b1, b2) | Corresponding node |
| --- | --- |
| 000 | P0 for 8 antenna ports |
| 001 | P1 for 8 antenna ports |
| 010 | P2 for 8 antenna ports |
| 011 | P3 for 8 antenna ports |
| 100 | P4 for 8 antenna ports |

If a muting indicator indicating a certain node is transmitted to the UE in the above-described embodiment, the reference signal pattern of the corresponding node is muted.

Referring again to FIG. 1, the CSI-RS collides with Rel-8 dedicated reference signal of port 5 in (a), (b), and (c), and collides with the Rel-8 Common Reference Signals (CRSs) of ports 2 and 3. Accordingly, embodiments of the present invention provide the following rules to mute when the Rel-8 dedicated reference signal and CRS are colliding with the CSI-RS to be muted.

If it is necessary to mute a signal at positions where the Rel-8 CRS or dedicated reference signal is transmitted, the reference signals are muted.

If the Rel-8 CRS for ports 3 and 4 are transmitted at certain RE positions in the reference signal pattern to be muted, the Rel-8 CRSs for ports 3 and 4 are transmitted while muting at the remaining RE positions.

If the Rel-8 dedicated reference signal for port 5 is transmitted at the RE position of the reference signal pattern to be muted, the Rel-8 dedicated reference signal for port 5 in transmitted at the corresponding RE positions while muting at the remaining RE positions.

If the Rel-8 CRSs for ports 3 and 4 and the Rel-8 dedicated reference signal for port 5 are transmitted at the RE positions of the reference signal pattern to be muted, the Rel-8 CRSs for ports 3 and 4 are transmitted at the REs for the Rel-8 CRSs while muting the remaining RE positions. Specifically, the dedicated reference signal for port 5 is muted at the corresponding RE positions.

If the Rel-8 CRSs for ports 3 and 4 and the Rel-8 dedicated reference signal for port 5 are transmitted at the RE positions of the reference signal pattern to be muted, the Rel-8 dedicated reference signal for port 5 is transmitted at the corresponding RE positions while muting at the remaining RE positions. Specifically, the reference signals for ports 3 and 4 are muted at the corresponding RE positions.

In a conventional LTE system, the UE generates Channel Quality Information (CQI) to be fed back in consideration of the overhead related to a CRS. In the LTE-A system, however, the newly introduced CSI-RS and DeModulation Reference Signal (DM-RS) can be muted.

Accordingly, if the CQI is generated in consideration of only the overhead of the CRS as in the conventional LTE system, there is likely to be a large difference when compared to the overhead generated in the LTE-A system. Although the enhanced Node B (eNB) can compensate for the CQI fed back from the UE in consideration of the energy loss, such compensation does not make up for the difference between the overhead measured in consideration of the energy loss and the actually applied overhead increases. Embodiments of the present invention remedy this difference through the methodology described in detail below.

When generating CQI, the UE averages the overheads of the CRS, CSI-RS, DM-RS, and muting, generates CQI in consideration of the averaged overhead, and feeds back the CQI to the eNB.

In the LTE-A system, the various reference signals are transmitted in a subframe, and the number of reference signals can vary in different subframes. Accordingly, in order to calculate the number of Physical Downlink Shared Channel (PDSCH) REs to transmit data, it is necessary to check the CRS, CSI-RS, and DM-RS transmitted in each subframe, check whether muting is applied, and subtract the number of REs carrying the reference signals from the total number of PDSCH REs to take the overhead into consideration. However, since the number of reference signals change in every subframe, the UE averages the numbers of REs carrying the CRS, CSI-RS, and DM-RS, and muted, and feeds back the CQI generated by taking the average into consideration as the overhead to the eNB.

In accordance with another embodiment of the present invention, muting a reference signal pattern can bring a change of transmission power. If a data signal is muted, the transmission power necessary for transmitting the data signal is saved. However, if not used by other REs, the saved transmission power is wasted. The transmission power saved by muting the data signal can be assigned to a RE for other data, the DM-RS signal, or the CSI-RS. In order to allocate the transmission power saved by muting, an additional control signal is required. However, the introduction of a new control signal increases the complexity in view of the UE. In case of the DM-RS, since the DM-RS transmission can be skipped in any Physical Resource Block (PRB) and the pattern of the DM-RS can be changed according to a change of transmission rank, it is not a good candidate to receive the saved power.

However, the CSI-RS is transmitted periodically and the transmission cycle of the CSI-RS is identical to that of the muting cycle. Therefore, the CSI-RS is a good candidate to receive the power saved by muting. Specifically, the transmitter can reallocate the transmission power saved by muting a certain signal to REs carrying CSI-RS. The number of REs reallocated the saved power is equal to the number of REs at which the signal is muted. The transmitter can perform this transmission power control in units of OFDM symbols.

The transmission power reallocation is described in greater detail below. When muting is applied, the transmitter performs the transmission power reallocation through one of the embodiments of the present invention described below. The transmitter can select one of the embodiments to reallocate the saved power. Even when the transmission power is saved by muting, the saved power is not reallocated for the CSI-RS. When the transmission power is saved by muting, the saved transmission power is reallocated for the CSI-RS. When the reference signal of the service cell is mapped in the OFDM symbol including the muted REs, the transmitter and the receiver assume that transmission power reallocation takes place. The transmission power reallocation for the CSI-RS can be performed in accordance with one of the embodiments of the present invention described below.

When there is no limit on transmission power for reallocation, the following can be taken into account. When there are N REs to which the reference signal of the serving cell are mapped and M muted REs in an OFDM symbol (e.g., the reference signal of the serving cell has the pattern P4 of FIG. 2(a), and the muted REs has the pattern P3 of FIG. 2(b)) and there is no limit on the transmission power for reallocation, the transmission power reallocated to the reference signal can be expressed by Equation (1) below.

$$p'_c = 10\log\left(\frac{M+N}{N}\right) + p_c \qquad (1)$$

$$p_c = \frac{P_{CSI-RS}}{P_{CRS}}$$

$P_{CRS}$: transmission power for CRS
$P_{CSI-RS}$: transmission power for CSI-RS When there is a limit on transmission power to be reallocated, Equation (2) is utilized, as described below $$p'_c = \min\left(10\log\left(\frac{M+N}{N}\right) + p_c, P_{max}\right) \qquad (2)$$

$P_{CRS}$: transmission power for CRS
$P_{CSI-RS}$: transmission power for CSI-RS
$P_{max}$: maximum transmission power of CSI-RS When a rule is predefined for reallocating the transmission power according to the number of reference signals and the number of muted signals (number of muted REs in the same OFDM symbol as the reference signal), the transmission power is reallocated according to the rule. Tables 8, 9, and 10 show rules for transmission power reallocation. In the following tables, the reference signal patterns follow those patterns illustrated in FIG. 2.

TABLE 8

| Number of REs of RS pattern | Number of REs of muting pattern | Reallocated transmission power |
|---|---|---|
| 2 | 2 | $p_c' = p_c + 3$ dB |
|  | 4 | $p_c' = p_c + 4.77$ dB |
|  | 6 | $p_c' = p_c + 6$ dB |
|  | 8 | $p_c' = p_c + 7$ dB |
|  | 10 | $p_c' = p_c + 7.78$ dB |
|  | 12 | $p_c' = p_c + 8.45$ dB |
|  | 14 | $p_c' = p_c + 9$ dB |
|  | 16 | $p_c' = p_c + 9.54$ dB |
|  | 18 | $p_c' = p_c + 10$ dB |
|  | 20 | $p_c' = p_c + 10.4$ dB |
|  | 22 | $p_c' = p_c + 10.8$ dB |
| 4 | 2 | $p_c' = p_c + 1.76$ dB |
|  | 4 | $p_c' = p_c + 3$ dB |
|  | 6 | $p_c' = p_c + 4$ dB |
|  | 8 | $p_c' = p_c + 4.77$ dB |
|  | 10 | $p_c' = p_c + 5.44$ dB |
|  | 12 | $p_c' = p_c + 6$ dB |
|  | 14 | $p_c' = p_c + 6.53$ dB |
|  | 16 | $p_c' = p_c + 6.98$ dB |
|  | 18 | $p_c' = p_c + 7.40$ dB |
|  | 20 | $p_c' = p_c + 7.78$ dB |
| 8 | 2 | $p_c' = p_c + 0.97$ dB |
|  | 4 | $p_c' = p_c + 1.76$ dB |
|  | 6 | $p_c' = p_c + 2.43$ dB |
|  | 8 | $p_c' = p_c + 3.0$ dB |
|  | 10 | $p_c' = p_c + 3.52$ dB |
|  | 12 | $p_c' = p_c + 3.98$ dB |
|  | 14 | $p_c' = p_c + 4.39$ dB |
|  | 16 | $p_c' = p_c + 4.77$ dB |

TABLE 9

| Number of REs of RS pattern | Number of REs of muting pattern | Reallocated transmission power |
|---|---|---|
| 2 | 2 | $p_c' = p_c + 3$ dB |
|  | 4 | $p_c' = p_c + 3$ dB |
|  | 6 | $p_c' = p_c + 3$ dB |
|  | 8 | $p_c' = p_c + 3$ dB |
|  | 10 | $p_c' = p_c + 3$ dB |
|  | 12 | $p_c' = p_c + 3$ dB |
|  | 14 | $p_c' = p_c + 3$ dB |
|  | 16 | $p_c' = p_c + 3$ dB |
|  | 18 | $p_c' = p_c + 3$ dB |
|  | 20 | $p_c' = p_c + 3$ dB |
|  | 22 | $p_c' = p_c + 3$ dB |
| 4 | 2 | $p_c' = p_c + 1.76$ dB |
|  | 4 | $p_c' = p_c + 3$ dB |
|  | 6 | $p_c' = p_c + 3$ dB |
|  | 8 | $p_c' = p_c + 3$ dB |

TABLE 9-continued

| Number of REs of RS pattern | Number of REs of muting pattern | Reallocated transmission power |
|---|---|---|
| | 10 | $\rho_c' = \rho_c + 3$ dB |
| | 12 | $\rho_c' = \rho_c + 3$ dB |
| | 14 | $\rho_c' = \rho_c + 3$ dB |
| | 16 | $\rho_c' = \rho_c + 3$ dB |
| | 18 | $\rho_c' = \rho_c + 3$ dB |
| | 20 | $\rho_c' = \rho_c + 3$ dB |
| 8 | 2 | $\rho_c' = \rho_c + 0.97$ dB |
| | 4 | $\rho_c' = \rho_c + 1.76$ dB |
| | 6 | $\rho_c' = \rho_c + 2.43$ dB |
| | 8 | $\rho_c' = \rho_c + 3.0$ dB |
| | 10 | $\rho_c' = \rho_c + 3.0$ dB |
| | 12 | $\rho_c' = \rho_c + 3.0$ dB |
| | 14 | $\rho_c' = \rho_c + 3.0$ dB |
| | 16 | $\rho_c' = \rho_c + 3.0$ dB |

TABLE 10

| Number of REs of RS pattern | Number of REs of muting pattern | Reallocated transmission power |
|---|---|---|
| 2 | 2 | $\rho_c' = \rho_c + 3$ dB |
| | 4 | $\rho_c' = \rho_c + 4.77$ dB |
| | 6 | $\rho_c' = \rho_c + 6$ dB |
| | 8 | $\rho_c' = \rho_c + 6$ dB |
| | 10 | $\rho_c' = \rho_c + 6$ dB |
| | 12 | $\rho_c' = \rho_c + 6$ dB |
| | 14 | $\rho_c' = \rho_c + 6$ dB |
| | 16 | $\rho_c' = \rho_c + 6$ dB |
| | 18 | $\rho_c' = \rho_c + 6$ dB |
| | 20 | $\rho_c' = \rho_c + 6$ dB |
| | 22 | $\rho_c' = \rho_c + 6$ dB |
| 4 | 2 | $\rho_c' = \rho_c + 1.76$ dB |
| | 4 | $\rho_c' = \rho_c + 3$ dB |
| | 6 | $\rho_c' = \rho_c + 4$ dB |
| | 8 | $\rho_c' = \rho_c + 4.77$ dB |
| | 10 | $\rho_c' = \rho_c + 5.44$ dB |
| | 12 | $\rho_c' = \rho_c + 6$ dB |
| | 14 | $\rho_c' = \rho_c + 6$ dB |
| | 16 | $\rho_c' = \rho_c + 6$ dB |
| | 18 | $\rho_c' = \rho_c + 6$ dB |
| | 20 | $\rho_c' = \rho_c + 6$ dB |
| 8 | 2 | $\rho_c' = \rho_c + 0.97$ dB |
| | 4 | $\rho_c' = \rho_c + 1.76$ dB |
| | 6 | $\rho_c' = \rho_c + 2.43$ dB |
| | 8 | $\rho_c' = \rho_c + 3.0$ dB |
| | 10 | $\rho_c' = \rho_c + 3.52$ dB |
| | 12 | $\rho_c' = \rho_c + 3.98$ dB |
| | 14 | $\rho_c' = \rho_c + 4.39$ dB |
| | 16 | $\rho_c' = \rho_c + 4.77$ dB |

Figure 4:
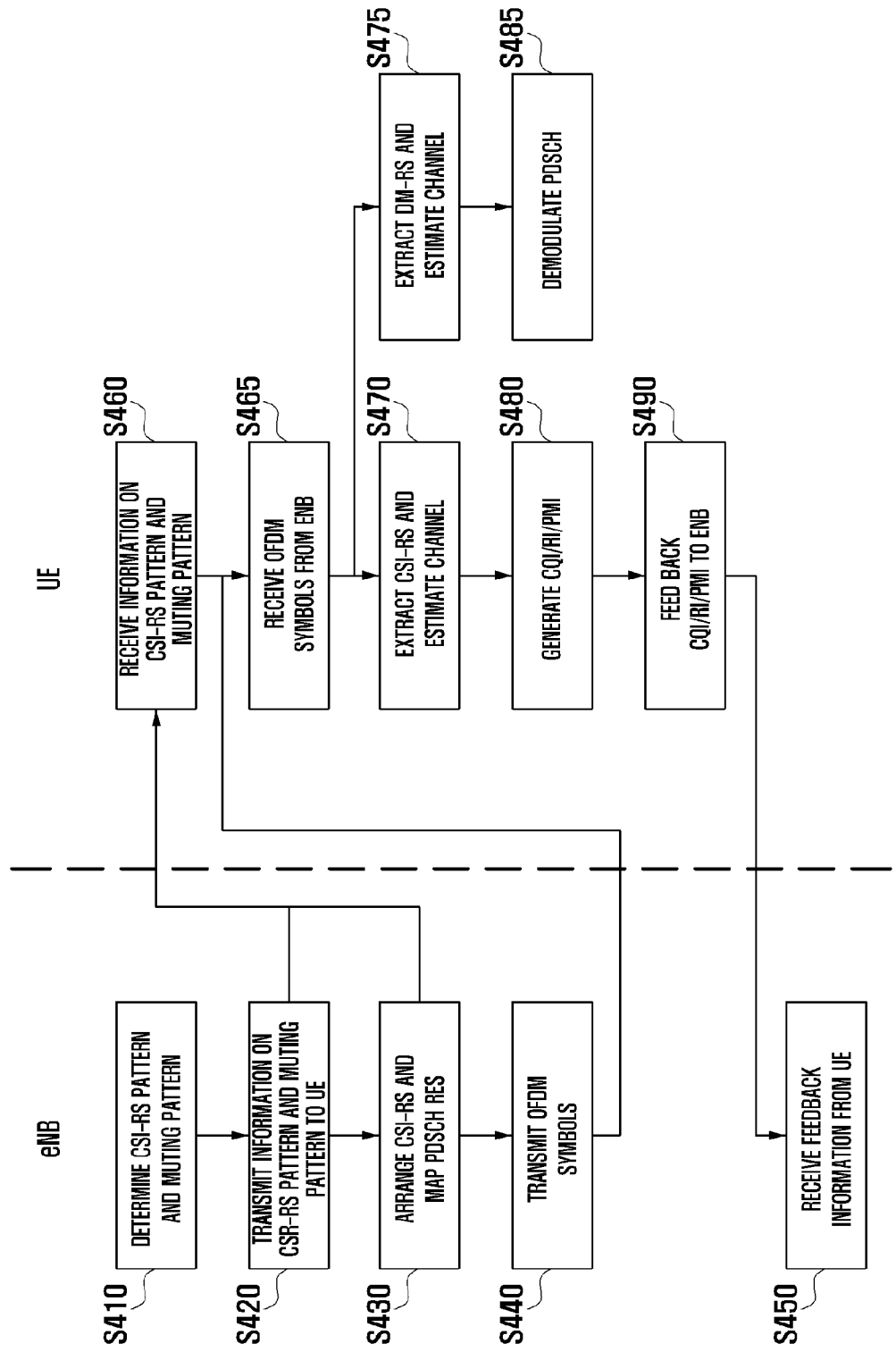
FIG. 4 is a flowchart illustrating a muting pattern notification methodology, according to an embodiment of the present invention.

FIG. 4 is a diagram illustrating operations of the eNB and UE, according to an embodiment of the present invention.

The transmitter (i.e., eNB) determines the reference signal (i.e., CSI-RS) pattern and muting information on the reference signal pattern (i.e., muting pattern), in step S410.

The transmitter notifies the receiver (i.e., UE) of whether reference signal muting is applied, in step S420. If the reference signal is muted, zero transmission power is allocated for the reference signal.

Notification of whether muting is applied is provided to the receiver according to the methods described above. When the REs for the CSI-RS pattern to be muted overlap with the REs to which the dedicated reference signals or CRSs are mapped, this problem can be overcome according to the methods described above. Specifically, the eNB assigns non-zero transmission power to the REs configured for transmitting the reference signals of the corresponding cell to the UE.

The transmitter arranges the control signal and data in the subframe according to the reference signal pattern and according to whether muting is applied to the reference signal pattern, in step 430. The transmitter performs OFDM modulation on the symbols and transmits the modulated symbols to the UE, in step S440.

The transmitter receives CQI from the UE, in step S450. The CQI is generated by averaging the overhead of at least one of the CRS, the CSI-RS, the DM-RS, and muting.

Meanwhile, the receiver receives the information on the reference signal pattern and muting to the reference signal pattern from the eNB, in step S460. With this information, the receiver can check the reference signal pattern and muting to the reference signal pattern (i.e., muting pattern).

The receiver receives the OFDM symbols transmitted by the transmitter, in step S465 and extracts the reference signal using the reference signal pattern and the reference signal muting information acquired at step S460. In more detail, the receiver estimates a channel using the CSI-RS among the extracted reference signal, in step S470. The receiver generates CQI, a Rank Indicator (RI), and a Precoding Matrix Indicator (PMI) based on the estimated channel, in step S480 and feeds back the CQI, RI, and PMI to the eNB, in step S490.

The receiver performs channel estimation using the DM-RS from among the extracted reference signals, in step S475. The receiver demodulates data channel using the estimation result, in step S485.

Figure 5:
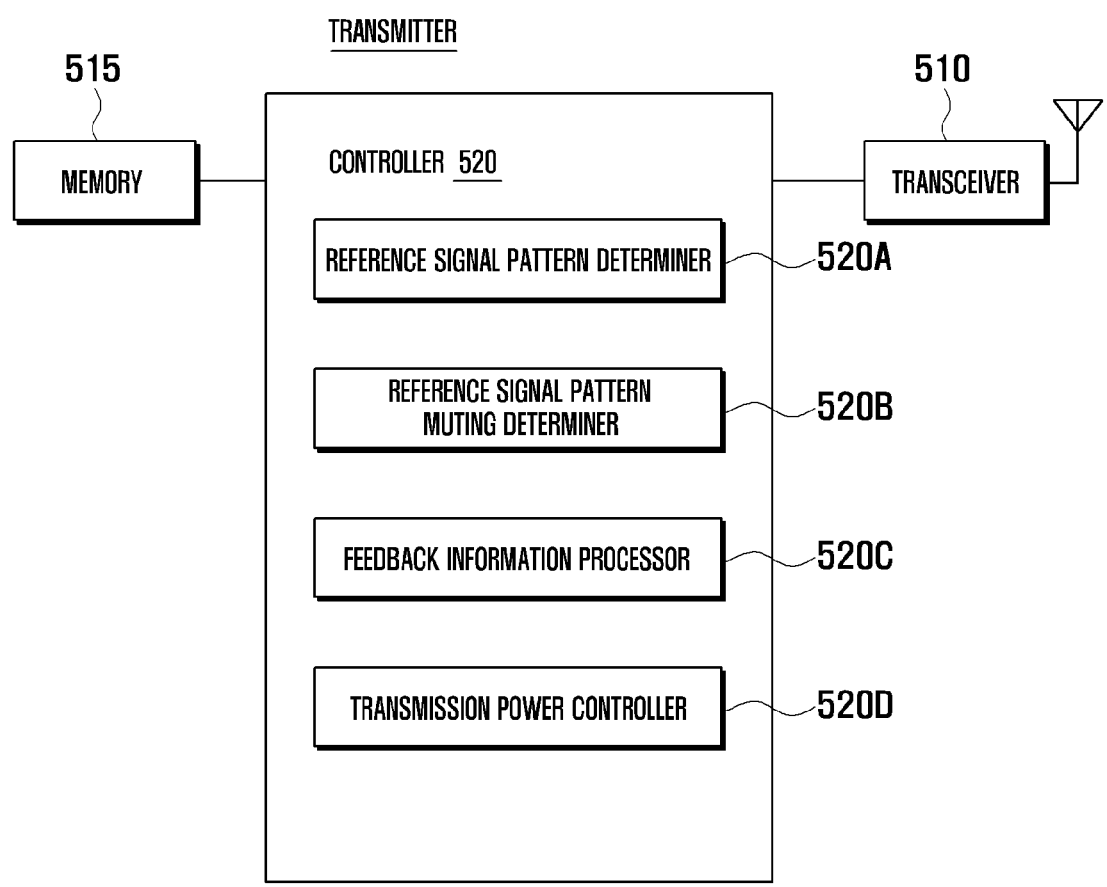
FIG. 5 is a block diagram illustrating a configuration of a transmitter, according to an embodiment of the present invention.

FIG. 5 is a block diagram illustrating a configuration of the transmitter, according to an embodiment of the present invention. As shown in FIG. 5, the transmitter includes a transceiver 510, memory 515, and a controller 520.

The transceiver 510 transmits the symbols of the OFDM-modulated control signal and data to the receiver. The transceiver 510 also receives the feedback information, e.g., CQI, transmitted by the receiver and forwards the feedback information to the controller 520.

The memory 515 stores programs and data necessary for the operations of the transmitter. The memory 515 of the transmitter can store the program for determining the reference signal pattern and generating the bitmap indicator for indicating whether the reference signal is assigned zero transmission power in unit of a certain number of resource elements.

The controller 520 controls overall operations of the transmitter according to an embodiment of the present invention. Particularly, the controller 520 includes a reference signal pattern determiner 520A, a reference signal pattern muting determiner 520B, a feedback information processor 520C, and a transmission power controller 520D.

The reference signal pattern determiner 520A checks a number of antenna ports used by the transmitter and determines the reference signal pattern according to the number of antenna ports. The reference signal can be embodied as the CSI-RS. The reference signal pattern can be composed of at least one RE. According to an embodiment of the present invention, the number of antenna ports can be 2, 4, or 8, and the reference signal pattern matched with the number of antennas are as depicted in FIG. 1.

The reference signal pattern muting determiner 520B determines whether to apply muting to the determined reference signal pattern and controls the process for notifying the receiver of the muting information, according to a predetermined method.

Particularly, the reference signal pattern muting determiner 520B configures a muting indicator (or bitmap indicator) for indicating whether muting is applied to the reference signal pattern in units with at least one RE, as described above in the first embodiment of the present invention. The reference signal pattern muting determiner 520B excludes the reference signal of the serving cell so as not to be muted. In another embodiment of the present invention, the reference signal pattern muting determiner 520B can exclude the reference signal pattern used for the reference signal of the serving cell in configuring the muting indicator.

As described above in the second embodiment of the present invention, the reference pattern muting determiner 520B can configure the different reference signal patterns determined according to the number of antenna ports used by the eNB in the form of tree structure. The tree structure has branched groups that each using the same REs. A codeword is assigned to a certain node of the tree to indicate whether muting is applied. If a codeword of a certain node is notified to the receiver, the reference signal pattern corresponding to the node is muted.

In more detail, according to the second embodiment of the present invention, all or some of the individual nodes constituting the tree structure can be assigned respective codewords.

As described in the third embodiment of the present invention, when positions of the Rel-8 dedicated reference signal or CRS are overlapped with the positions of the CSI-RS to be muted, the reference signal pattern muting determiner 520B can adjust appropriately as described above.

The feedback information processor 520C receives the feedback information transmitted by the receiver through the transceiver 510 and processes the feedback information. The feedback information can include CQI, RI, and PMI. The CQI can be generated by averaging the overhead of at least one of the CRS, CSI-RS, DM-RS, and muting.

The transmission power controller 520D can reallocate the transmission power saved by muting to another reference signal, particularly a CSI-RS. The transmission power reallocation method is described in greater detail above.

Figure 6:
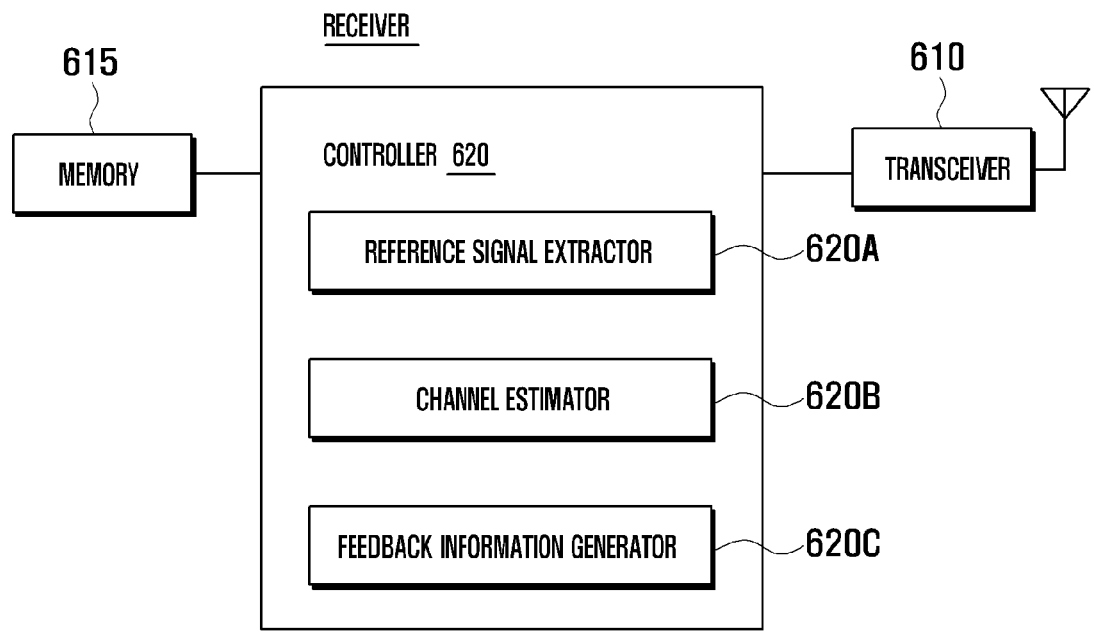
FIG. 6 is a block diagram illustrating a configuration of a receiver, according to an embodiment of the present invention.

FIG. 6 is a block diagram illustrating a configuration of the receiver, according to an embodiment of the present invention. As shown in FIG. 6, the receiver includes a transceiver 610, a memory 615, and a controller 620.

The transceiver 610 receives the OFDM symbols carrying the control signal and data transmitted by the transmitter. Simultaneously, the transceiver 610 transmits the feedback information generated by the controller 620 to the transmitter.

The memory 615 stores programs and data necessary for the operations of the receiver. The memory 615 can store the program for extracting, when the bitmap indicator indicating whether the reference signal is assigned zero transmission power is received, the reference signal from according to the received reference signal pattern and bitmap indicator and processing the extracted reference signal.

The controller 620 controls overall operations of the receiver according to an embodiment of the present invention. The controller 620 includes a reference signal extractor 620A.

The reference signal extractor 620A extracts reference signals from the subframe transmitted by the transmitter. The extracted reference signals can include a CRS, a dedicated reference signal, a DM-RS, and a CSI-RS. Particularly, the reference signal extractor 620A can extract the CSI-RS using the information on the reference signal pattern and whether muting is applied to the reference signal pattern (i.e., muting pattern), which is provided by the transmitter in advance.

In more detail, the reference signal extractor 620A controls the transceiver 610 to receive the bitmap indicator indicating the reference signal pattern composed of at least one RE and indicating whether the at least one RE is assigned zero transmission power. The reference signal extractor 620A extracts and process the reference signal based on the reference signal pattern and bitmap indicator.

The reference signal extractor 620A delivers the extracted reference signal to the channel estimator 620B.

The channel estimator 620B estimates the radio channel condition between the transmitter and the receiver using the reference signal extracted by the reference signal extractor 620A. The radio channel condition is estimated using the reference signal demodulated by the channel estimator 620B and used for demodulating a data channel (i.e., PDSCH).

The feedback information generator 620C generates the feedback information to be fed back to the transmitter using the channel estimation value provided by the channel estimator 620B. The feedback information can include CQI, RI, and PMI.

Particularly, the feedback information generator 620C generates the CQI by averaging the overhead of at least one of the CRS, CSI-RS, DM-RS, and muting.

According to the above-described embodiments of the present invention, the eNB notifies the UE of the muting information on the reference signal pattern by means of a muting indicator indicating whether the reference signal pattern is muted in units of at least one RE or a codeword allocated to a certain node of a tree structure. The UE can receive the muting information on the reference signal pattern, extract the reference signal from the received OFDM symbols efficiently, and perform channel estimation based on the extracted reference signal.

Also, using the UE feedback information generated by averaging the overhead of at least one of the CRS, CSI-RS, DM-RS, and muting, the eNB can acquire more accurate radio channel state information.

Software components including instructions or code for performing the methodologies described herein may be stored in one or more of associated memory devices (e.g., Read Only Memory (ROM), fixed or removable memory) and, when ready to be utilized, loaded in part or in whole (e.g., into Random Access Memory (RAM)) and executed by a CPU.

While the invention has been shown and described with reference to certain embodiments thereof, it will be understood by those skilled in the art various changes in form and detail may be made therein without departing from the spirit and scope of the invention as defined by the appended claims.

What is claimed is:

1. A method for transmitting at least one reference signal of a base station in a mobile communication system, comprising the steps of:
   determining, at the base station, a non-zero transmission power reference signal configuration among a first plurality of reference signal configurations, wherein the non-zero transmission power reference signal configuration comprises at least one resource element;
   generating, at the base station, a bitmap indicator indicating a zero transmission power reference signal configuration among a second plurality of reference signal configurations; and
   transmitting information for the non-zero transmission power reference signal configuration and the bitmap indicator from the base station to a terminal.

2. The method of claim 1, wherein when resource elements for the non-zero transmission power reference signal configuration overlap with resource elements for a zero transmission power reference signal configuration indicated by the bitmap indicator, the overlapped resource elements are assumed as a non-zero transmission power reference signal.

3. The method of claim 1, wherein the first plurality of reference signal configurations comprise two or four or eight resource elements.

4. The method of claim 1, wherein the second plurality of reference signal configurations comprise four resource elements.

5. The method of claim 1, wherein the non-zero transmission power reference signal configuration and the zero transmission power reference signal configuration comprise at least one Channel State Information Reference Signal (CSI-RS).

6. A base station for transmitting at least one reference signal in a mobile communication system, comprising:
  a reference signal determiner that determines a non-zero transmission power reference signal configuration among a first plurality of reference signal configurations, wherein the non-zero transmission power reference signal configuration comprises at least one resource element;
  a reference signal muting determiner configured to generate a bitmap indicator indicating a zero transmission power reference signal configuration among a second plurality of reference signal configurations; and
  a transceiver configured to transmit information for the non-zero transmission power reference signal configuration and the bitmap indicator to a terminal.

7. The base station of claim 6, wherein, when resource elements for the non zero transmission power reference signal configuration overlap with resource elements for the zero transmission power reference signal configuration indicated by the bitmap indicator, the overlapped resource elements are assumed as a non-zero transmission power reference signal.

8. The base station of claim 6, wherein the first plurality of reference signal configurations comprise two or four or eight resource elements.

9. The base station of claim 6, wherein the second plurality of reference signal configurations comprise four resource elements.

10. The base station of claim 6, wherein the non-zero transmission power reference signal configuration and the zero transmission power reference signal configuration comprise at least one Channel State Information Reference Signal (CSI-RS).

11. A method for processing at least one reference signal transmitted by a base station in a mobile communication system, comprising the steps of:
  receiving, at a terminal, information for a non-zero transmission power reference signal configuration among a first plurality of reference signal configurations from the base station, wherein the non-zero transmission power reference signal configuration comprises at least one resource element;
  receiving a bitmap indicator indicating a zero transmission power reference signal configuration among a second plurality of reference signal configurations; and
  processing the at least one reference signal extracted according to information for the non-zero transmission power reference signal configuration and the bitmap indicator.

12. The method of claim 11, when resource elements for the non-zero transmission power reference signal configuration overlap with resource elements for the zero transmission power reference signal configuration indicated by the bitmap indicator, the overlapped resource elements are assumed as a non-zero transmission power reference signal.

13. The method of claim 11, wherein the first plurality of reference signal configurations comprise two or four or eight resource elements.

14. The method of claim 11, wherein the second plurality of reference signal configurations comprise four resource elements.

15. The method of claim 11, wherein the non-zero transmission power reference signal configuration and the zero transmission power reference signal configuration comprise at least one Channel State Information Reference Signal (CSI-RS).

16. A terminal for processing at least one reference signal transmitted by a base station in a mobile communication system, comprising:
  a transceiver configured to communicate signals with the base station; and
  a controller configured to control the transceiver to receive information for a non-zero transmission power reference signal configuration among a first plurality of reference signal configurations, wherein the non-zero transmission power reference signal configuration comprises at least one resource element, and a bitmap indicator indicating a zero transmission power reference signal configuration among a second plurality of reference signal configurations, and to process the at least one reference signal extracted according to the information for the non-zero transmission power reference signal configuration and the bitmap indicator.

17. The terminal of claim 16, when resource elements for the non-zero transmission power reference signal configuration overlap with resource elements for the zero transmission power reference signal configuration indicated by the bitmap indicator, the overlapped resource elements are assumed as a non-zero transmission power reference signal.

18. The terminal of claim 16, wherein the first plurality of reference signal configurations comprise two or four or eight resource elements.

19. The terminal of claim 16, wherein the second plurality of reference signal configurations comprise four resource elements.

20. The terminal of claim 16, wherein the non-zero transmission cower reference signal configuration and the zero transmission power reference signal configuration comprise at least one Channel State Information Reference Signal (CSI-RS).

* * * * *